Jan. 18, 1966     H. Y. HALLOCK     3,229,736

SAW BLADE FOR CUTTING LOGS

Filed June 26, 1964     2 Sheets-Sheet 1

INVENTOR
HIRAM Y. HALLOCK

BY

ATTORNEYS 3,229,736
SAW BLADE FOR CUTTING LOGS
Hiram Y. Hallock, Madison, Wis., assignor to the United States of America as represented by the Secretary of Agriculture
Filed June 26, 1964, Ser. No. 378,474
5 Claims. (Cl. 143—133)

(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This application is a continuation-in-part of my application, Serial No. 223,854, filed September 14, 1962, now abandoned.

This invention relates to a circular saw blade for cutting lumber from logs and has among its objects the provision of a log saw blade with a saw plate tapered such that the tension on the saw rim is increased during the cutting operation and which, in use materially reduces sawdust, thereby increasing lumber recovery. Other objects will be apparent from the description of the invention which follows.

The economical utilization of sawdust remains one of the major problems in the sawmilling field. Numerous small scale, profitable uses have been developed for sawdust, and recently the acceptance by some pulpmills of large sawdust particles as a raw material holds at least some promise of large scale economic usage in the future. The fact remains, however, that in none of these uses does wood in the sawdust form have near the value it would have in the form of lumber. Therefore, decreasing the amount of sawdust developed in the process of sawing lumber from logs, cants, or flitches is more advantageous and economical than in finding uses for the sawdust.

Approximately 10 million tons of sawdust are produced annually in the United States by circular sawmills with saw kerfs averaging about $10/32$ inch. The instant invention will cut kerf of $6/32$ to $7/32$ inch effectively, indicating an annual, national, potential reduction of from 3 to 4 million tons of sawdust or a production increase of 1½ billion board feet of lumber per year.

One of the methods for eliminating some sawdust and increasing the volume of lumber that can be sawed from a log is to reduce the width of the saw kerf. This can be done by reducing the width of the saw teeth. Since normally the body of the saw plate must be thinner than the teeth to provide clearance, any reduction in the width of the teeth requires a corresponding reduction in the saw plate thickness.

With circular log saw blades whose tooth width has been reduced sufficiently to materially reduce sawdust and increase lumber recovery, the thickness of the plate of the saw must be reduced to the point where it does not possess sufficient rigidity for satisfactory performance. In an attempt to provide this required rigidity, saw makers have tried building additional steel into the saw plate by tapering it from the thinner saw rim to the thicker center at the eye. These "conical" saws may be tapered on one or both sides of the cross section. Those tapered on both sides have a cross section that is symmetrical about a line perpendicular to the axis of rotation of the saw. Those tapered on only one side are not symmetrical about the above-defined line. Instead, one side of the cross section is parallel to the line and the other side is at an angle with respect to the line.

Although "building more steel" into the saw plate increases its rigidity appreciably, it does not solve the problem. To operate satisfactorily, all circular log saws, regardless of their cross-section form, require an alteration of their physical properties to compensate for the thermal centrifugal, and mechanical forces applied and absorbed by the saw plate during operation. These forces operate critically on the conical or tapered saw plate in two general areas thereof, namely, the rim area (that area nearest the rim and teeth of the saw blade) and the central area (that area nearest the axis of rotation of the saw blade). The inner area of the saw plate, lying between the aforementioned rim area and central area, is not directly affected by these forces.

The rim area is subject to thermal expansion caused by friction, centrifugal force, and the mechanical force of the teeth cutting into the wood. These forces all tend to elongate the saw rim, thus placing the rim area in compression relative to its condition at rest.

The central area of the conventional, conical saw blade (that area nearest the axis of rotation) is also subject to compression during operation. This relative compression is caused by the thermal expansion of the area set up by the rubbing of the sides of the saw plate in this central area (which is the thickest portion of the conventional saw blade) against the saw kerf wall.

Thus the forces operating on the conventional conical or tapered saw plate during operation place the rim and central areas in severe compression. The area lying between these areas herein denominated the "inner" area, is not subject to these forces and resists the expansion of the central and rim areas. As a result the inner area is in extreme tension. The tension in the inner area and the compression in the central and rim areas result in a distortion of the saw plate from a true plane normal to the axis of rotation. This distortion is often easily observed with the naked eye. When it occurs, the advantage of the tapering of the saw plate is lost. Satisfactory operation of the saw blade requires the elimination of this distortion which the instant invention accomplishes.

The instant invention provides a saw blade structure tapered in a novel manner which combines the advantages of extra saw stiffness resulting from more steel in the saw body and a narrow kerf resulting from a thinner rim and narrower teeth. Because of its unique cross-section structure, the saw blade of this invention not only eliminates the problem of friction-induced thermal expansion in the central area of the saw plate during operation but utilizes self-induced thermal expansion in the inner area of the saw plate to assist in the relief of tension in this area with a resulting and correlated reduction in the saw rim compression and saw blade distortion.

In order that the invention may be readily understood, reference is made to the following description and to the accompanying drawing in which.

Figure 1:
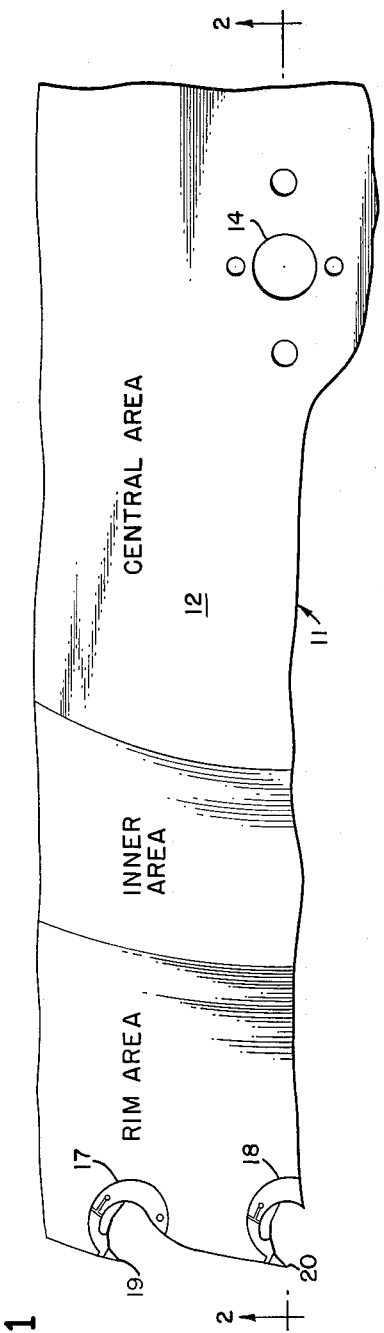
FIG. 1 is a side view of one embodiment of a circular saw blade of the invention, partially broken away, and illustrating the rim area, the inner area, and the central area, all defined below, of the saw plate thereof.

In general, this invention relates to a circular saw blade which comprises a saw plate having two sides, a plurality of saw teeth on the outer periphery of the saw plate and an opening in the center thereof for mounting the saw blade on a spindle for rotation. More particularly, this invention relates to the sides of the saw plate which, for purposes of definition, have a rim area, a central area near the axis of rotation, and inner area therebetween. The central area is defined as that portion of the plate lying within a circle, which is coincidental with the surface of the saw plate and the center of which coincides with the center of the saw plate, and having a radius of about 50% of the whole radius of the saw plate. The inner area is that portion of the plate lying between the 50% of radius circle and a circle, which is also coincidental with the surface of the saw plate and the center of which also coincides with the center of the saw plate, of a radius of about 70% of the radius of the whole saw plate. The rim area is that portion of the plate lying outside the 70% of radius circle on the surface of the saw plate. Having thus defined the areas concerned, consider the first embodiment of the invention in a diametrical cross section. One side of the saw plate is represented as a straight line running perpendicular to the axis of rotation. The other side of the saw plate is represented by a broken line in three segments. The segment representing the side of the saw plate in the central area runs perpendicular to the axis of rotation and parallel to the other side of the saw plate. The segment representing the side of the saw plate in the inner area inclines slightly toward the other side of the saw plate from its junction with the point representing the outer edge of the central area to the point representing the outer edge of the inner area. The segment representing the side of the saw plate in the rim area inclines to an even greater extent toward the other side of the saw plate from the point representing the outer edge of the inner area to the point representing the outer edge of the saw plate. Referring to the second embodiment of the invention, viewed in diametrical cross section, both sides of the saw plate are represented by a broken line similar to that described above. Thus, in both embodiments of the invention, the saw plate is tapered from its center to its rim such that the sides of the plate lie in the relationship described above. Practically then, the saw blade is constructed such that when it is rotated to cut a log, the inner surface of the cut board rubs against the saw plate in the inner area, inducing thermal expansion. This locally-induced expansion, in turn, obviates the tensile and compressive stresses which cause distortion in the ordinary conical or tapered saws. The design of the blade is such that the contact between the inner surface of the tapered side and the kerf wall is minimal—enough only to induce the required thermal expansion. The force required to drive this portion of the saw plate against the kerf wall is not great; it is probably about the same as that developed in the contact between the sides of a saw plate and kerf wall in the standard conical saw plate, and is more than offset by the reduction in kerf made possible by this design. The important distinction to be noted in the instant invention is that the force expended in driving a portion of the side of the saw plate against the kerf wall is used to advantageously tension the saw plate. In the standard conical saw plate, this force is detrimental and wasted.

The relation between the axial extent of the edges of the cutting means and the thickness or axial extent of the sides of the saw plate, where one side of the saw plate is flat, may be expressed as $$\frac{W_1-K-T}{.3R}=\frac{W_2-W_1}{.7R-XR}$$

where R is the radius of the saw plate, K is one-half the thickness of the cutting means, T is one-half the thickness of the saw plate at its outermost extremity, $W_1$ is the thickness of the saw plate at .7R, $W_2$ is the thickness of the saw plate at XR, and X is some value less than .7, preferably about .5. Thus, in the pilot model, the radius of which was 25 inches, the radius of the central area was 13.635 inches (XR), the width of the inner area was 3.865 inches (.7R—XR), and the width of the rim area was 7.50 inches (R—.7R). On this blade, the central area was 5 gage (.220 inch) in thickness, the inner area tapered from 5 gage at its junction with the central area to 6 gage (.203 inch), and the rim area tapered from 6 gage at its junction with the inner area to 11 gage (.120 inch) on the outer rim of the saw blade. The thickness of the teeth, or cutting edges, was 5 gage (.220 inch).

The relation between the axial extent of the edges of the cutting means and the thickness or axial extent along the sides of the saw plate, where both sides of the saw plate are tapered, may be expressed as:

$$\frac{T_1-K}{.3R}=\frac{T_2-T_1}{.7R-XR}$$

where R is the radius of the saw plate, K is one-half the thickness of the cutting means, $T_1$ is one-half the thickness of the saw plate at .7R, $T_2$ is one-half the thickness of the sawplate at XR, and X is some value less than .7, preferably about .5.

The saw plate can be tapered on either one or both of its sides, as indicated above, so that either one or both of the surfaces of the log being cut rub against the inner area of either or both of the sides of the saw plate.

Figure 2:
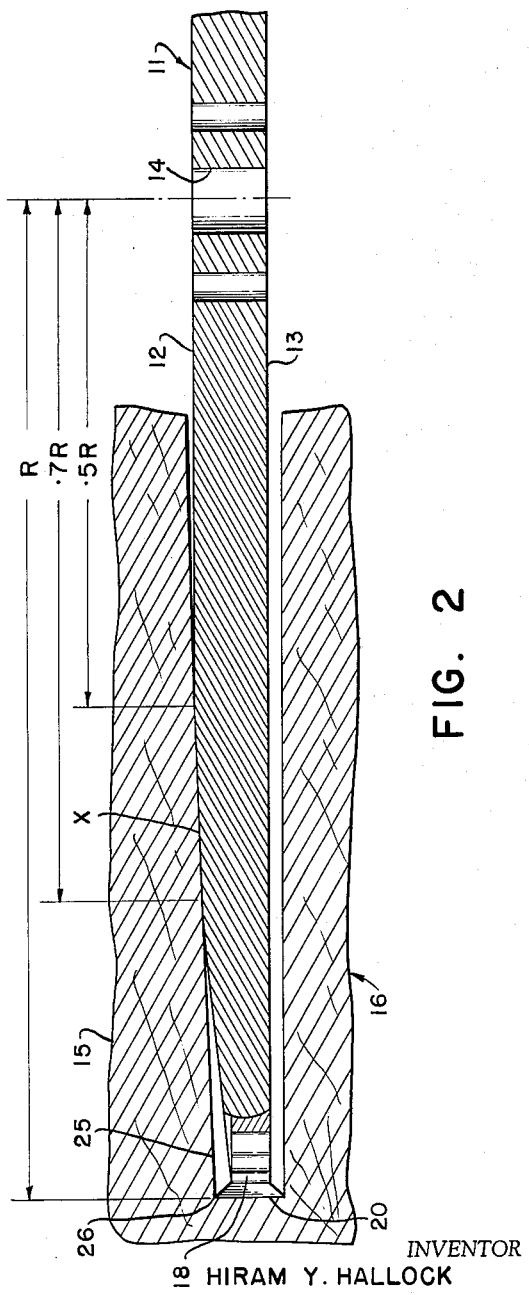
FIG. 2 is a view on the line 2—2 of FIG. 1.

Referring to FIGS. 1 and 2 of the drawing, the preferred form of circular saw blade of the invention comprises saw plate 11 having sides 12 and 13 which are represented as having an outer rim area, an inner area, and a central area, as defined above, and as designated by appropriate legends in the drawing on side 12 only. The central area is provided with an opening 14 in the center of the blade through which the circular saw blade may be conventionally mounted on a shaft (not shown) for rotation to saw lumber, as, for example, board 15, from log 16, by means of conventional cutting teeth, two of which, namely teeth 17 and 18, having cutting edges 19 and 20, respectively, are illustrated.

The saw plate 11 is constructed so that its cross section, when taken on a diameter, as in FIG. 2, is such that the inner surface 25 of the cut defines a line drawn from the extremity 26 of the cutting edge 20 of tooth 18 that coincides with the surface of side 12 in the area bounded by an outside radius of about 70% of the radius of the saw plate (indicated as ".7R" in FIG. 2), and an inside radius of about 50% of the radius of the saw plate (indicated as ".5R" in FIG. 2) or, the inner area as defined above. Surface 25 does not coincide with any other area of the saw plate and does not intersect its surface. The area thus defined, that is, ".7R" less ".5R," and designated by "X" in the drawing (FIG. 2) corresponds to the inner area of side 12 of the saw plate.

In the sawing operation, therefore, the board 15, being cut from log 16, rubs against the saw plate 11 in the inner area "X" only thereby inducing thermal expansion therein, with its accompanying advantages, as mentioned above.

Figure 3:
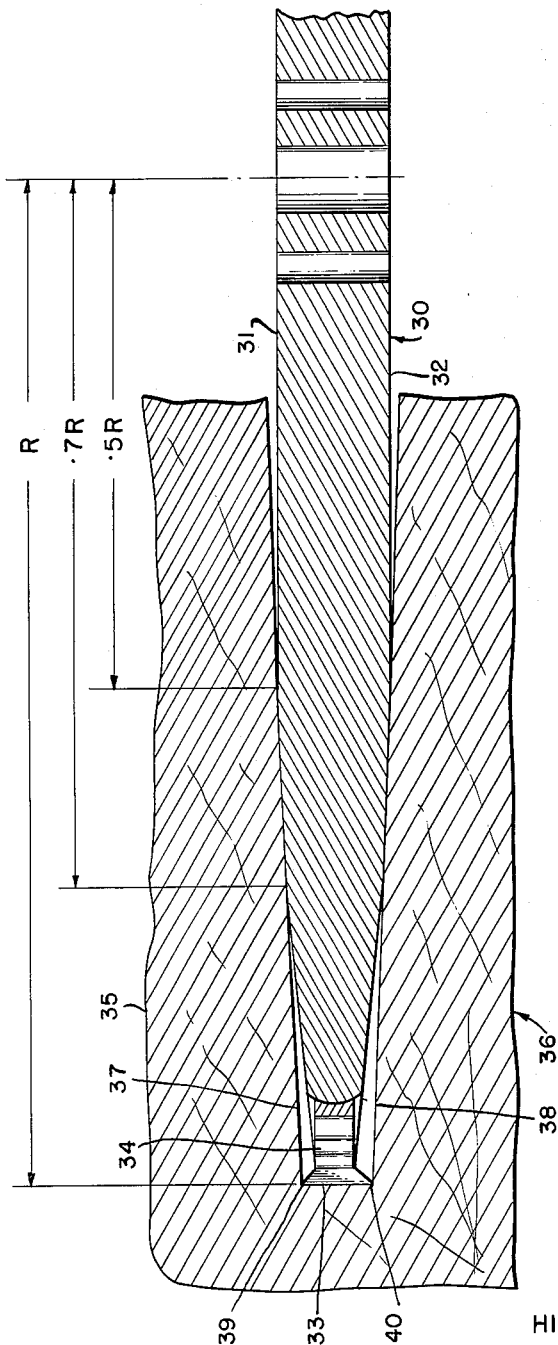
FIG. 3 is a view corresponding to that of FIG. 2 of a second embodiment of the invention.

FIG. 3 illustrates a second embodiment of the invention having parts corresponding in structure and function to those depicted in the embodiment of FIGS. 1 and 2.

In this embodiment both surfaces of the saw plate 30 are similar to surface 12 of the plate shown in FIG. 2 so that the saw is symmetrical about a plane through the center of the thickness and perpendicular to the axis of rotation. Thus, each of sides 31 and 32 of the saw plate 30 are shaped to have an inner area similar to the inner area on side 12 in FIGS. 1 and 2. As in the case of the latter, this inner area is defined by the two concentric circles having a radii of .7R and .5R, where R is the radius to the cutting edge 33 of a tooth 34. When cutting a board 35 from log 36, both surfaces 37 and 38 of the cut board lie on lines drawn from the extremities 39 and 40, respectively, of cutting edge 33 and coinciding with the points on the surfaces of the saw plate between about .7R and about .5R from the center of the axis of rotation. These lines do not coincide with any other areas of the saw plate and do not intersect its surfaces.

When using the second embodiment just described, friction of the saw-cut surfaces on the inner areas of both faces of the plate produces the same thermal expansion referred to in connection with the embodiment of FIGS. 1 and 2 to equalize the tensile and compressive forces to prevent distortion.

I claim:
1. A circular saw blade comprising a two-sided saw plate perforated at its center for mounting on a spindle and a plurality of peripheral cutting means, at least one of said sides being tapered, said tapered side, when viewed in a diametrical cross section, consisting of a broken line tapering toward a plane perpendicular to the axis of rotation of said saw plate such that from the center of said saw plate to a point substantially .5R on the plate, where R is the radius of the plate, the line is parallel to said plane, and from the substantially .5R point to a point substantially .7R on the plate, the line slopes slightly toward said plane, and from the point substantially .7R to the outer periphery, the line slopes to an even greater extent toward said plane, such that if said line representing that portion of the saw plate between substantially .5R and substantially .7R were extended it would intersect the said cutting means at its outermost axial extent on tha side of the saw plate.

2. A circular saw blade comprising a two-sided saw plate perforated at its center for mounting on a spindle and a plurality of peripheral cutting means, one side of the said saw plate being essentially a flat, plane surface lying perpendicular to the axis of rotation, the other side of the said saw plate being tapered, said tapered side, when viewed in a diametrical cross section, consisting of a broken line tapering toward the flat, plane surface of the said saw plate such that from the center of the said saw plate to a point substantially .5R on the plate, where R is the radius of the plate, the line is parallel to the said flat side of the said saw plate, and from the substantially .5R point to a point substantially .7R on the plate, the line slopes slightly toward the said flat side of the said saw plate, and from the point substantially .7R to the outer periphery, the line slopes to an even greater extent toward the said flat side of the said saw plate, such that if the said line representing that portion of the saw plate between substantially .5R and substantially .7R were extended it would intersect the said cutting means at its outermost axial extent on that side of the said saw plate.

3. A circular saw blade comprising a two-sided saw plate perforated at its center for mounting on a spindle and a plurality of peripheral cutting means, both sides of the said saw plate being tapered such that when the saw plate is viewed in a diametrical cross section, the tapered sides consist of broken lines tapering toward one another, such that from the center of the said saw plate to a point substantially .5R on the plate, where R is the radius of the plate, the lines are parallel to one another, and from the substantially .5R point to a point substantially .7R on the plate, the lines slope slightly toward one another, and from the point .7R to the outer periphery, the lines slope to an even greater extent toward one another, such that if the lines representing the sides of the saw plate between substantially .5R and substantially .7R were extended to the said cutting means of the said saw blade, they would intersect the said cutting means at their respective outermost axial extents.

4. A circular saw blade comprising a two-sided saw plate perforated at its center for mounting on a spindle and a plurality of peripheral cutting means, one side of the said saw plate being essentially a flat, plane surface lying perpendicular to the axis of rotation, the other side of the said saw plate being tapered, said taper providing a saw plate tapered according to the relationship $$\frac{W_1 - T - K}{.3R} = \frac{W_2 - W_1}{.7R - XR}$$

where R is the radius of the saw plate, K is one-half the thickness of the cutting means, T is one-half the thickness of the saw plate at its outermost extremiy, $W_1$ is the thickness of the saw plate at .7R, $W_2$ is the thickness of the saw plate at XR, and X is some value less than .7.

5. A circular saw blade comprising a two-sided saw plate perforated at its center for mounting on a spindle and a plurality of peripheral cutting means, both sides of the said saw plate being tapered such that when the saw plate is viewed in a diametrical cross section, the tapered sides consist of broken lines tapering toward one another according to the relationship $$\frac{T_1 - K}{.3R} = \frac{T_2 - T_1}{.7R - XR}$$

where R is the radius of the saw plate, K is one-half the thickness of the cutting means, $T_1$ is one-half the thickness at .7R, $T_2$ is one-half the thickness at XR, and X is some value less than .7.

References Cited by the Examiner
UNITED STATES PATENTS

| | | |
|---|---|---|
| 198,142 | 12/1877 | Morreau. |
| 334,440 | 1/1886 | Ireland. |
| 1,861,218 | 5/1932 | Huther. |
| 2,673,586 | 3/1954 | Pierson _____ 143—133 X |

DONALD R. SCHRAN, *Primary Examiner.*

WILLIAM W. DYER, JR., *Examiner.*